(12) United States Patent
Aida et al.

(10) Patent No.: US 6,602,411 B1
(45) Date of Patent: Aug. 5, 2003

(54) MAGNETIC TREATING APPARATUS OF WATER

(75) Inventors: Akira Aida, 3-8, Higashigaoka 2 chome, Meguro-ku, Tokyo 152-0021 (JP); Yoshitaka Abe, 33-7, Oowadamachi, 1 chome, Hachioji-shi, Tokyo, 192-0045 (JP); Tsunehisa Kurino, Tokyo (JP)

(73) Assignees: Akira Aida, Tokyo (JP); Yoshitaka Abe, Tokyo (JP)

( * ) Notice: Subject to any disclaimer, the term of this patent is extended or adjusted under 35 U.S.C. 154(b) by 139 days.

(21) Appl. No.: 09/665,909

(22) Filed: Sep. 20, 2000

(30) Foreign Application Priority Data

Sep. 21, 1999 (JP) ............................. 11-267291

(51) Int. Cl.⁷ .................................................. C02F 1/48
(52) U.S. Cl. ...................... 210/222; 210/243; 204/660
(58) Field of Search ............................... 210/222, 243; 204/660

(56) References Cited

U.S. PATENT DOCUMENTS

| | | | |
|---|---|---|---|
| 4,605,498 A | * | 8/1986 | Kulish .......................... 210/222 |
| 4,935,133 A | | 6/1990 | Hirama ......................... 210/222 |
| 4,956,084 A | | 9/1990 | Stevens |
| 4,999,106 A | | 3/1991 | Schindler |
| 5,024,271 A | * | 6/1991 | Meihua ......................... 210/222 |
| 5,024,759 A | | 6/1991 | McGrath et al. |
| 5,037,546 A | | 8/1991 | Janczak |
| 5,078,870 A | | 1/1992 | Carpenter |
| 5,122,277 A | | 6/1992 | Jones |
| 5,198,106 A | | 3/1993 | Carpenter |
| 5,238,558 A | | 8/1993 | Curtis |
| 5,238,577 A | * | 8/1993 | Newsom ....................... 210/222 |
| 5,304,302 A | | 4/1994 | Bossert |
| 5,364,536 A | | 11/1994 | Mercier |
| 5,366,623 A | | 11/1994 | Clair |
| 5,378,362 A | | 1/1995 | Schoepe |
| 5,380,403 A | | 1/1995 | Robeson et al. |
| 5,411,143 A | | 5/1995 | Greene |
| 5,468,378 A | | 11/1995 | de la Torre Barreiro |
| 5,500,121 A | | 3/1996 | Thornton et al. |
| 5,584,994 A | | 12/1996 | Hattori et al. |
| 5,683,579 A | * | 11/1997 | Lopes ........................... 210/222 |
| 5,683,586 A | * | 11/1997 | Harcourt et al. ............. 210/222 |
| 5,716,520 A | | 2/1998 | Mason |
| 5,733,458 A | | 3/1998 | Kitazawa et al. |
| 5,766,461 A | | 6/1998 | Kämpf |
| 5,776,346 A | | 7/1998 | Fukai |
| 5,783,074 A | | 7/1998 | Stanley |
| 5,837,143 A | | 11/1998 | Mercier |
| 5,866,010 A | | 2/1999 | Bogatin et al. |
| 6,007,715 A | | 12/1999 | Liu et al. |

FOREIGN PATENT DOCUMENTS

| | | |
|---|---|---|
| JP | 3011870 | 3/1995 |
| JP | 9-57273 | 3/1997 |
| JP | 3043069 | 8/1997 |
| JP | 9-308888 | 12/1997 |

\* cited by examiner

*Primary Examiner*—David A. Reifsnyder
(74) *Attorney, Agent, or Firm*—Armstrong, Westerman & Hattori, LLP

(57) ABSTRACT

The activating efficiency of water in the magnetic treating apparatus is enhanced by the electric conductors 4 located in the magnetic field-generating region 5 or by utilizing a magnetic circuit having the dipole magnetic ring structure 10.

18 Claims, 11 Drawing Sheets

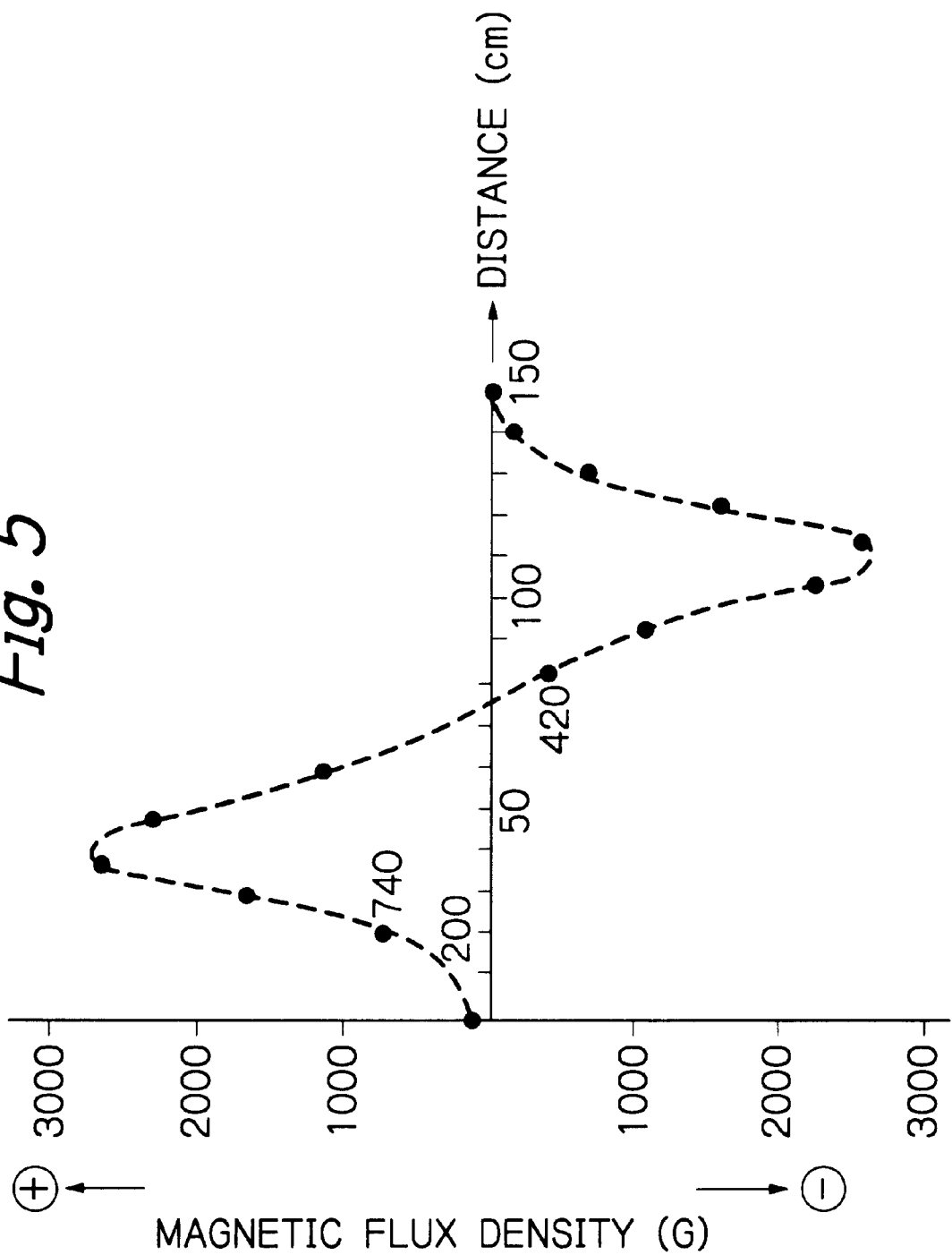

Fig. 16
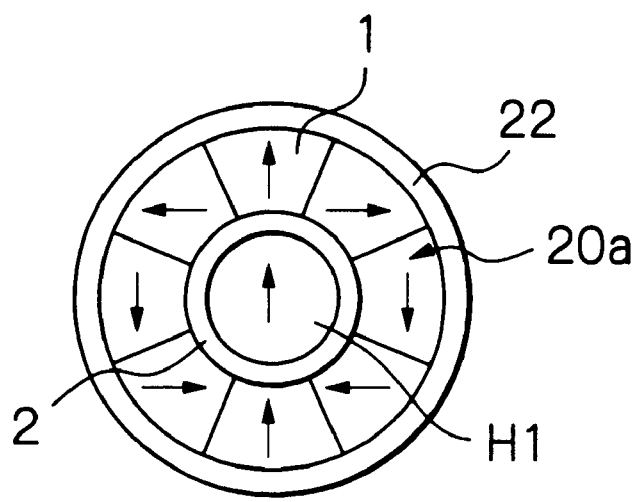
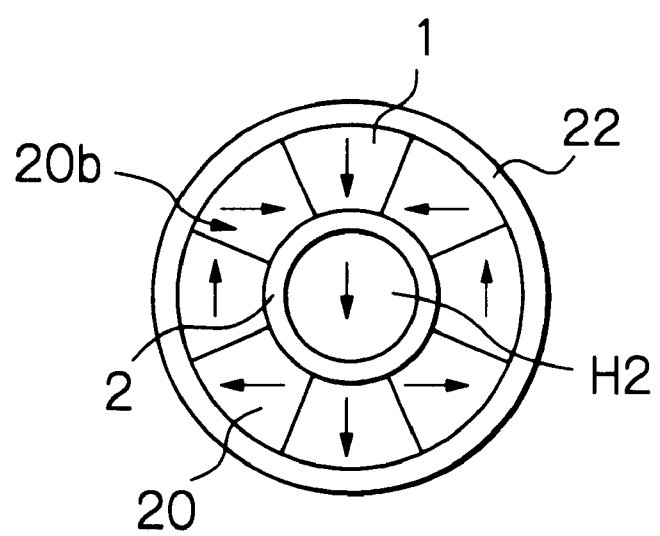

MAGNETIC TREATING APPARATUS OF WATER

BACKGROUND OF INVENTION

1. Field of Invention

The present invention relates to a magnetic treating apparatus of water, more particularly, a magnetic treating apparatus of water in which a novel combination of permanent magnets or of a permanent magnet and an electric conductor is employed to increase the current generated in such apparatus. Such apparatus is used for treating or conditioning potable water, industrial water, water passed through a building conduit, hot-springs, gardening water, recycled water in a factory, and the like.

2. Description of Related Art

Various apparatuses for treating or conditioning water have been proposed to apply a magnetic field to the water passed through a conduit and hence to prevent the scale formation, to activate water or to attain other purposes. The electro-motive force necessary for activating water is generated by applying the principle of MHD (magneto hydrodynamic) power generation. Under this principle, the water must flow perpendicular to the direction of the magnetic field. The water conduit may, therefore, be sandwiched between a magnet having an N pole and another magnet having an S pole.

Japanese Unexamined Patent Publication (kokai) No. 9-308,888 discloses a magnetic treating apparatus of water constructed under the above-described principle. In this apparatus, a yoke provided outside the water conduit and permanent magnets focuses the magnetic flux within the water conduit. The permanent magnets are arranged lengthwise along the water conduit in such a manner that the upper and lower magnets have an S pole and an N pole, respectively. A direct-current magnetic field is, therefore, generated.

Japanese Unexamined Patent Publication (kokai) No. 9-57,273 proposes to arrange a plurality of permanent magnets in the treating apparatus of water in such a manner that the direction of the magnetic field is identical.

U.S. Pat. No. 4,935,133 discloses a magnetic treater constructed under the above-described principle. The permanent magnets are arranged within a casing, lengthwise along the longitudinal direction of the casing, and are maintained at predetermined intervals therebetween. The opposed pair of the permanent magnets have the opposite poles, and the water passes through the clearance between the opposed pair of the permanent magnets.

Japanese Utility Model Registration No. 3,043,069 discloses a treating apparatus of water in which the direction of the magnetic field is reversed along the longitudinal direction of a water conduit. This publication does not describe how the MHD electromotive force is influenced by waveforming material located outside the permanent magnets.

Japanese Utility Model Registration No. 3,011,870 proposes to insert a metallic plate within a water-conducting conduit of a magnetic treating apparatus. Red rust is allegedly prevented or removed by such metallic plate by the following effects of the invention. Anions impinge on the metallic plate and discharge electrons; these electrons negatively ionize the dissolved oxygen at the site opposite to the impinging site. The resultant $O_2$ reduces the red rust. A metallic plate is provided to bridge the regions where a plurality of opposing magnets having opposite poles are located.

U.S. Pat. No. 5,683,579 discloses a magnetic fluid conditioner which comprises: a pipe; a concentric core within a pipe; several magnets containing segments of opposite poles arranged exterior to the pipe; and a wire electrically connected to the core and to the ground. According to an embodiment, four separate magnets are arranged at equal distances about the pipe. Each magnet has six separate sections. The magnet sections near the pipe where the fluid enters is charged north. The next section is charged south, with the next section charged north, and vice versa. This invention involves a discovery that a variable resistor, which controls the electrical flow through the controlled electrical return path, can control the magnetic field within the pipe.

The present inventors recognize that the activation degree attained by the conventional treating apparatuses of water is low because their consideration of the principle of MHD electromotive force is inadequate. Specifically, neither the metallic plate proposed in Japanese Utility Model Registration No. 3,011,870 nor the core and wire proposed in U.S. Pat. No. 5,683,579 can enhance the MHD electromotive force which is described more in detail hereinbelow.

SUMMARY OF INVENTION

It is, therefore, an object of the present invention to provide a treating apparatus of water which can enhance the activation efficiency of water.

In accordance with the objects of the present invention there is provided treating apparatus of water comprising:
- a water conduit in which the water flows in a first direction;
- at least one neighboring pair of magnetic field-generating regions in said water conduit in which regions a magnetic field is generated in a second direction essentially perpendicular to said first direction and applies a magnetic field to said water;
- a first electric conductor, which is located in one of said magnetic field-generating regions and a third direction essentially perpendicular to said first direction and second direction intersects said first electric conductor; and,
- a second electric conductors, which is located in the other of said magnetic field-generating regions and a third direction essentially perpendicular to said first direction and second direction intersects said second electric conductor; said first and second electric conductors being in electrically non-contact with one another.

Preferably, said second direction varies as seen in the flowing direction of water. Preferably, a pair of the first electric conductors is arranged opposite to one another, and a pair of the second electric conductors is arranged opposite to one another.

There is also provided a magnetic treating apparatus of water comprising:
- a water conduit, through which the water flows in a first direction;
- at least one magnetic field-generating region for generating the magnetic field in a second direction essentially perpendicular to said first direction in said water conduit, which region comprising a plurality of permanent magnets having a wedge-shaped cross sectional shape and arranged to form a dipole magnetic ring structure.

The present invention is hereinafter described with reference to preferred embodiments illustrated in the drawings.

BRIEF DESCRIPTION OF DRAWINGS

FIG. 5 shows the result of measurement of the magnetic flux density within a water conduit and an example of the alternating magnetic field.

FIG. 16 is a front view of the magnetic circuit used in FIG. 14.

DESCRIPTION OF PREFERRED EMBODIMENTS

Figure 1:
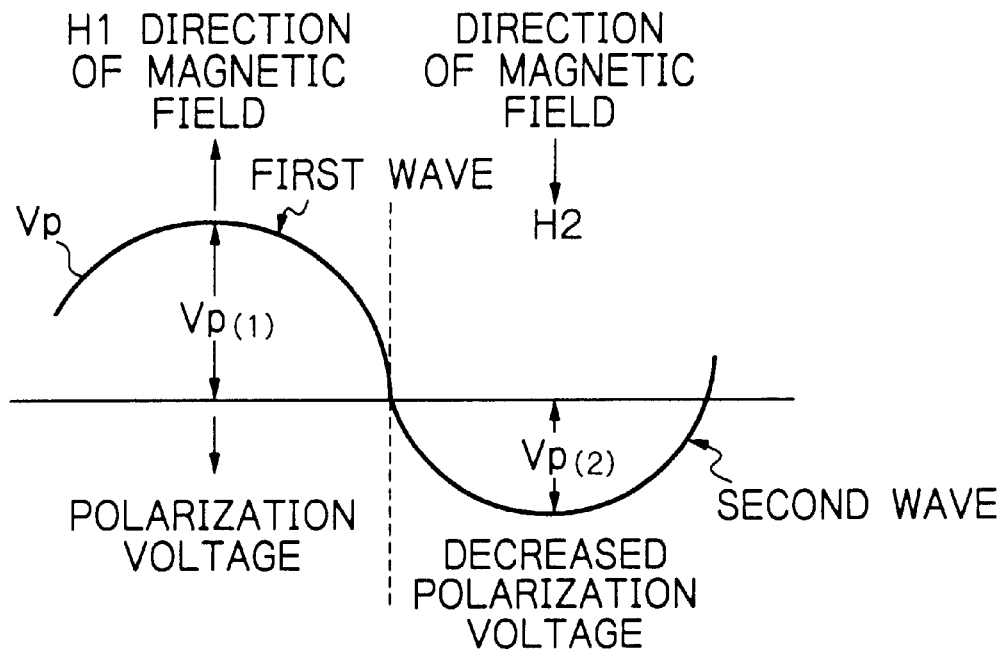
FIG. 1 is a graph showing the polarization voltage generated under the alternating magnetic field.

According to a magnetic treating apparatus of water of the present invention, the direction of the magnetic field, i.e, the first direction. The second direction and hence the direction of MHD electromotive force are changed. According to a preferred embodiment, poles of the magnets are reversed in the water conduit. For example, a pair of permanent magnets having an N pole and an S pole is opposed, and another pair of permanent magnets having S and N poles is opposed. This pair and another pair of permanent magnets are arranged lengthwise along the longitudinal direction of a water conduit. As a result, the direction of the magnetic field is caused to change as shown in FIG. 1, that is, the directions of the first wave $H_1$ and the second wave $H_2$ are reversed 180°. The magnet arrangement of this preferred embodiment is hereinafter referred to as heterogeneous pole-arrangement and is described more in detain hereinafter.

The present inventors discovered previously that the electromotive force increases in the magnetic treating apparatus having the heterogeneous pole-arrangement under the alternating magnetic field by the following mechanism. The polarization voltage of the second wave decreases less than that of the first wave ($|V_{p(1)}|>|V_{p(2)}|$), likewise, the second and third waves. The MHD generating current gradually increases, therefore, with the sequence of the waves, i.e., the second, third waves and the like.

Figure 2:
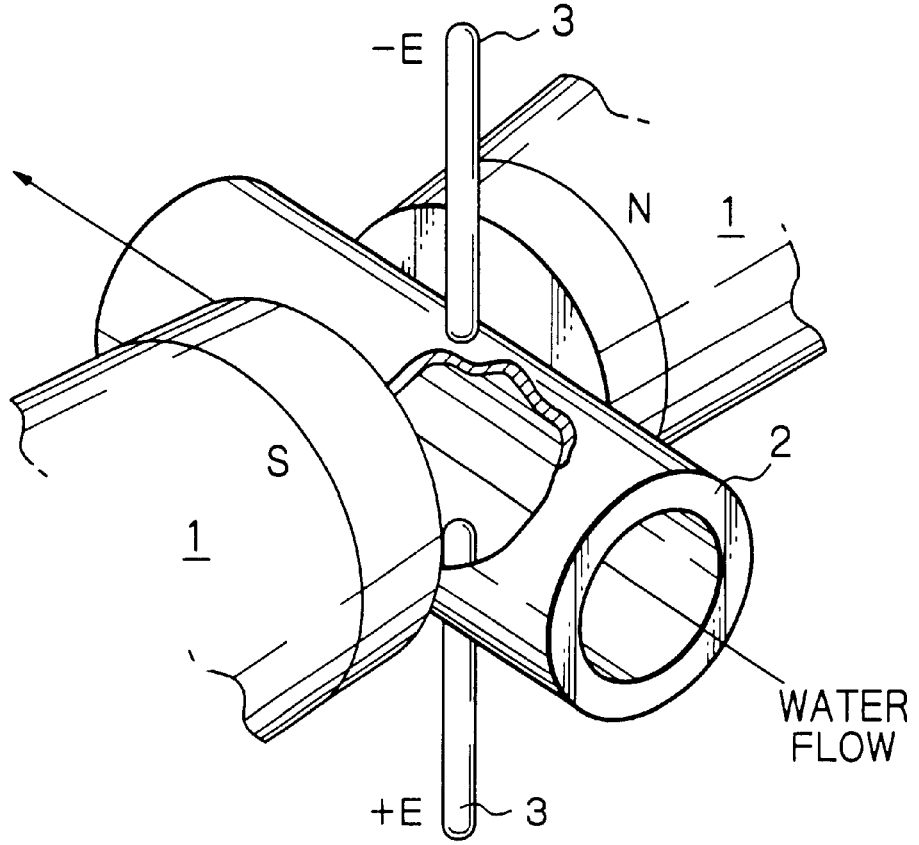
FIG. 2 illustrates a method for measuring the MHD current.
Figure 3:
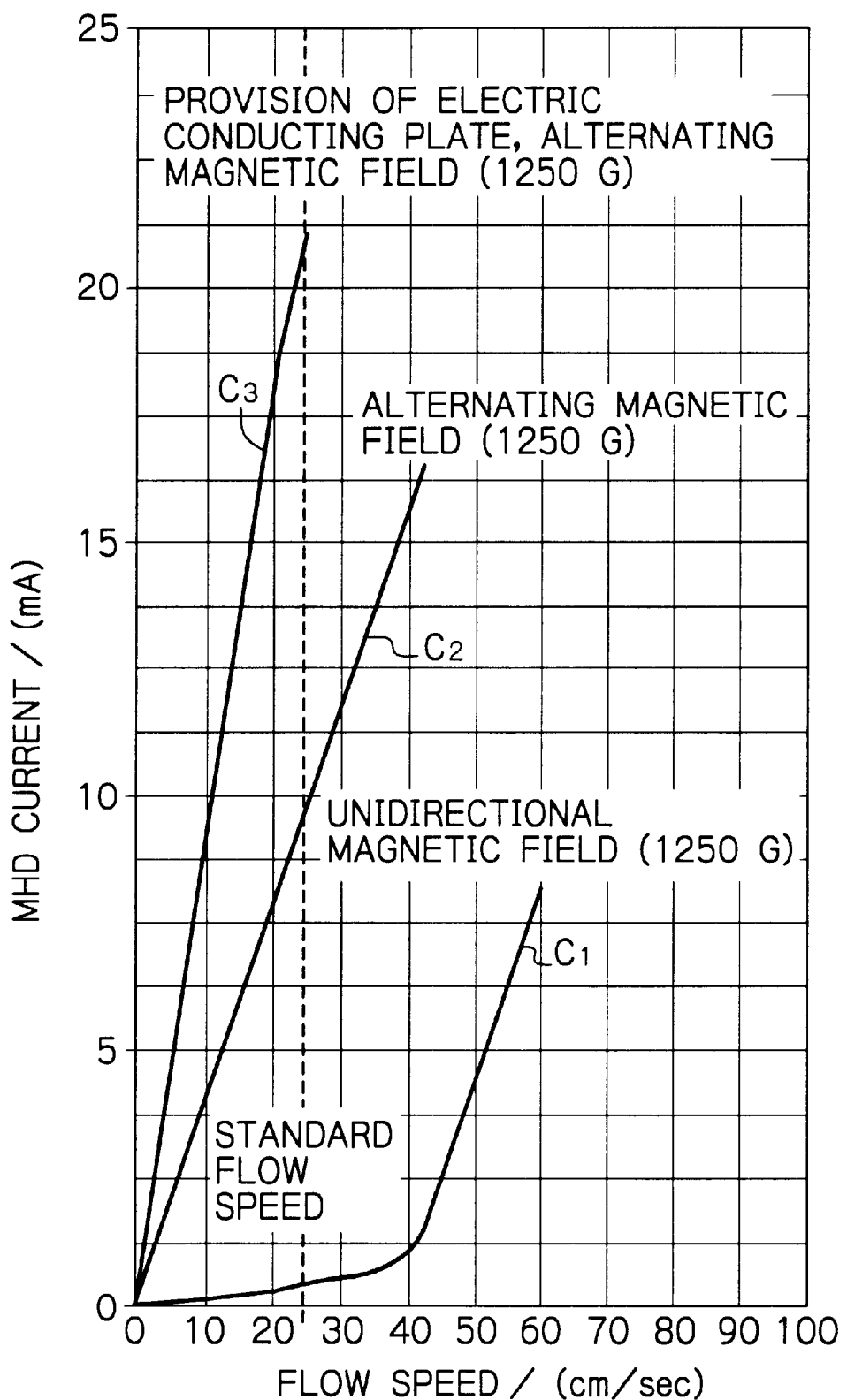
FIG. 3 is a graph showing a relationship between the speed of the water stream and the generated current under the alternating magnetic field and the unidirectional magnetic field.

Water flowing through a conduit having 20 mm of diameter was subjected to the alternating current or the uni-directional field having 1250 G of intensity. The MHD current generated in the water conduit described above was measured by using the apparatus shown in FIG. 2, in which the reference numerals 1, 2 and 3 denote the permanent magnets, the water conduit and the electrodes, respectively. Only one of a plurality of pairs of permanent magnets is shown in FIG. 2. The result is shown in FIG. 3. As is apparent from FIG. 3, the critical flowing speed is recognized at approximately 40 cm/sec in the case of a uni-directional magnetic field ($C_1$). No such critical flowing speed is clear in the case of an alternating magnetic field ($C_2$). Furthermore, the MHD current generated in the magnetized water is considerably higher in the alternating magnetic field than in the uni-directional field, provided that the flowing speed is identical. Incidentally, graph ($C_3$) with the notation of provision of an electric conducting plate and an alternating magnetic field corresponds to an example of the present invention described hereinafter.

Figure 4A:
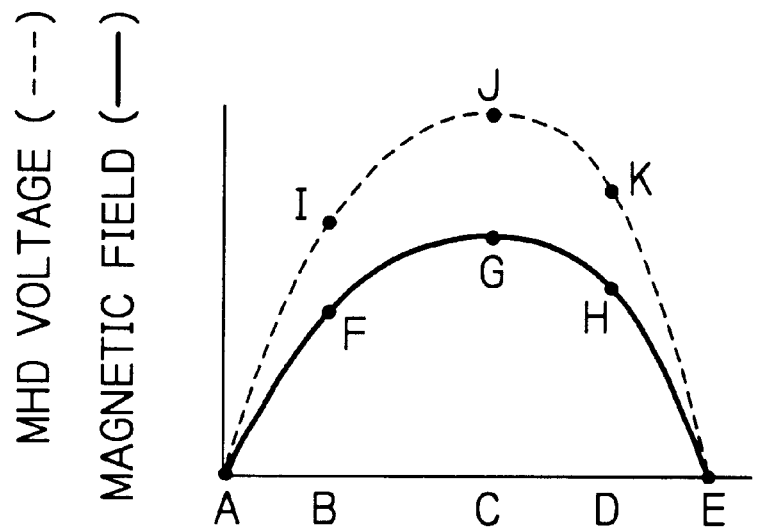
FIG. 4(a) illustrates the magnetic field and the MHD voltage wave.
Figure 4B:
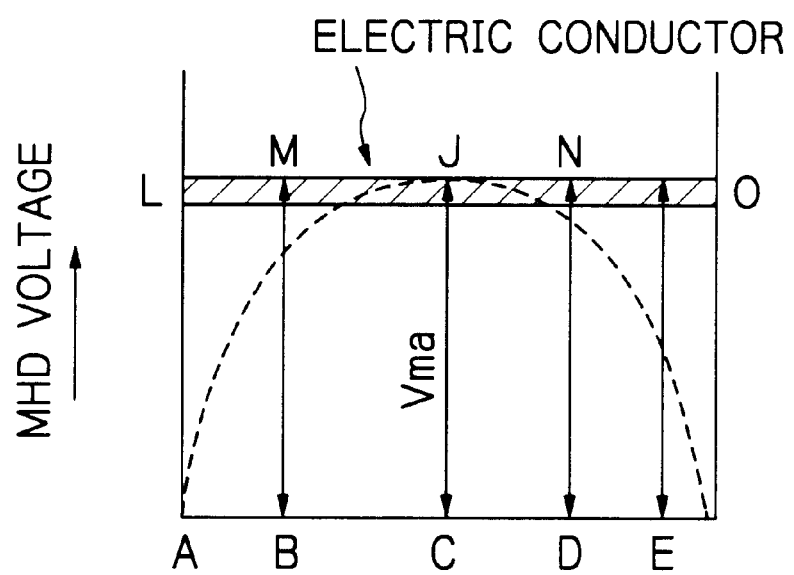
FIG. 4(b) illustrates the MHD voltage applied to the electric conductor.

The present inventors considered another method for increasing the electromotive force. Referring to FIG. 4(a), the solid line indicates the magnetic field, while the dotted line indicates the MHD voltage. The magnetic field generated in the positions A, B, C, D and E of the water conduit is shown by the reference numerals A (=0 Oe), F, G, H and E (=0 Oe), respectively. The MHD current generated in the positions A, B, C, D and E of the water conduit is shown by the reference numerals A (=0 V), I, J, K and E (=0V), respectively. The voltage generated in the water conduit is the average value of the dotted-line curve and is considerably lower than the maximum voltage J (FIG. 4(a)). When an electric conductor 4 is provided in the magnetic field-generating region (MHD current-generating region) as shown in FIG. 4(b), the highest voltage $V_{max}$ is applied to all portions of the electric conductor 4. The dotted-line curve shown in FIG. 4 is the voltage generated in the water conduit without an electric conductor.

In order to utilize the current through the current conductor 4, which is generated by the MHD electromotive force, for the water activation, the following points are requisite.

(a) An electric conductor is located in each of the neighboring magnetic field-generating regions. Between the neighboring magnetic field-generating regions, water, resin material of the water conduit and the like are present but the current conductor is not present. The current conductor must not extend from one to the other neighboring magnetic field region.

(b) An electric conductor is arranged in each of the neighboring magnetic field-generating regions. The third direction, which is essentially perpendicular to the directions of both the magnetic field and the water stream, intersects the electric conductor. A pair of the electric conductors may be arranged in each of the neighboring magnetic field-generating region. Such pair may be opposite to one another in such a manner that the electric conductors are arranged in the first direction.

Regarding the requirement (a), the direction of MHD electromotive force generated in the neighboring regions is reversed. If the electric conductor is present in a region between the neighboring magnetic field-generating regions, the MHD electromotive forces in one magnetic field-generating region and another neighboring region are offset, so that there is no current conduction. This can be avoided by the requirement (a). The requirement (a) also results in potential difference between one electric conductor, in which the positive charges pass, and another electric conductor, in which the negative charges pass. The water is activated by the current flowing in the water under this potential difference. The requirement (b) arises from the principle of the MHD power generation. When an electric conductor, such as a metallic plate is arranged as (b) in the direction of MHD electromotive force, the electric conductors can extract the current.

Two pairs of magnetic field-generating regions, in which the electric conductor is arranged as described above, are, therefore, present in the present invention, as one unit. Two or more units may be located in the present invention. In this embodiment, two pairs and the other two pairs of the magnetic field generating region must be sufficiently distant from one another.

(c) The direction of MHD electromotive force varies in a pair of the neighboring magnetic field-generating regions. The positive and negative charges generate in the one and the other neighboring magnetic field-generating regions, respectively. When these requirements (a), (b) and (c) are fulfilled, the generated current is greatly increased, specifically approximately twice ($C_3$) as high as that of $C_2$ as shown in FIG. 3.

It would be evident from the descriptions hereinabove that the water conduit, in which the electric conductor is located, must be of electric insulated material, such as vinyl chloride; and, the electric conductor must be located in the magnetic-field generating region. Provided that these points are fulfilled, the current conductor may be of any shape and any dimension. One or more current conductors may be located in each magnetic field-generating region.

The current conductor may be located in any position within the water conduit. However, the current conductor is preferably rigidly secured on the inner wall of a water conduit, because the magnetic treating apparatus is advantageously free of maintenance.

In addition, the magnetic field can be generated by an electro-magnet, permanent magnet and the like. Its position may be in non-contact with the water conduit as shown in FIG. 2. Preferably, the permanent magnets are rigidly secured on the outer peripheral surface of a water conduit, and a permanent magnet having an N pole and a permanent magnet having an S pole are positioned opposite to one another, because the magnetic treating apparatus is free of maintenance. Preferably, the lengths of a permanent magnet and an electric conductor in the flowing direction of water are virtually the same.

Figure 6:
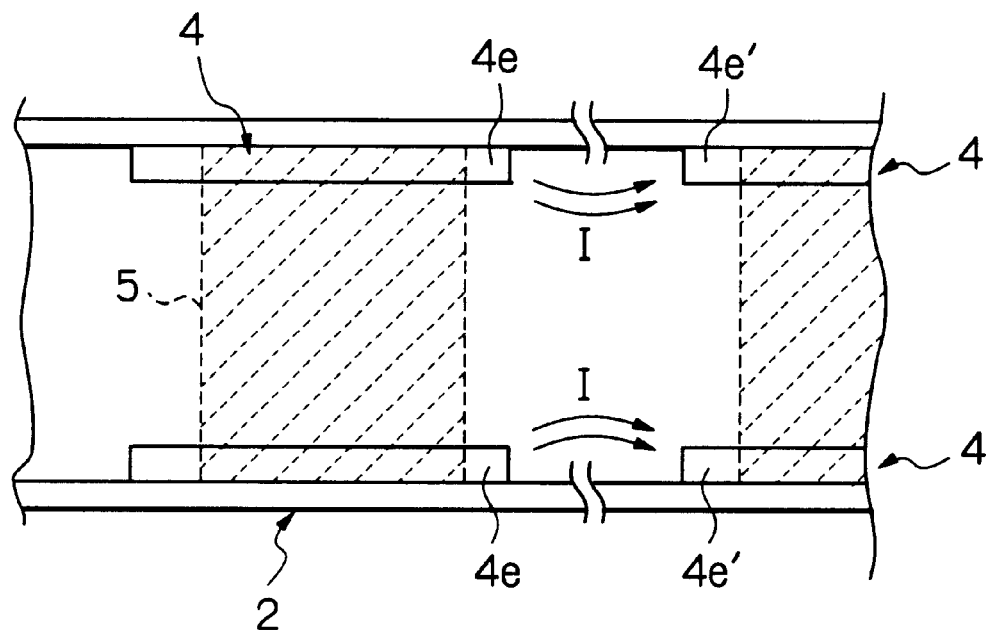
FIG. 6 schematically illustrates an embodiment of the magnetic treating apparatus according to the present invention and also the current, which activates the water.

A vinyl chloride tube having 20 mm of diameter was sandwiched between two pairs of permanent magnets, each having 40 mm of length in the flowing direction of water. The magnetic flux density generated by a pair of the permanent magnets was measured. The results are shown in FIG. 5. This graph illustrates an embodiment of the magnetic field-generating region. In this region, the magnetic flux density is not stationary at a constant value but demonstrates a continuous curve with two peaks. When the distance between two pairs of the permanent magnets is greater than as shown in FIG. 5, an alternating magnetic field does not generate but a region of zero magnetic flux density is formed between the separate magnetic field-generating regions. Such decrease in the polarization voltage as described with reference to FIG. 1 cannot, therefore, be utilized. However, electric conductors according to the present invention can be located in such magnetic field-generating regions as shown in FIG. 6. Since the electric conductors 4 have extension 4e, 4e' exterior to the magnetic field-generating regions 5, the current I flowing between these extensions 4e and 4e' contributes to activate the water.

The effect of increasing current according to the invention is slight, when the peak value of magnetic flux density in a water conduit is less than 1000 G or more than 3000 G. A more preferred magnetic flux density is from 1500 to 2000 G.

Figure 7:
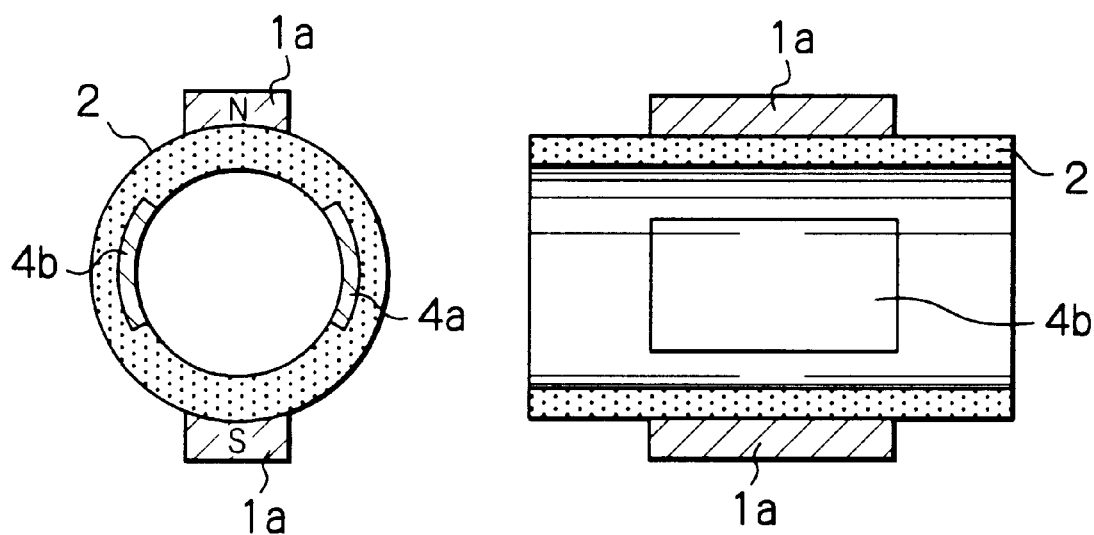
FIG. 7 shows an embodiment of arrangement of the current conductor.

Referring to FIG. 7 an embodiment of locating the electric conductors in the magnetic field-generating region is illustrated. The grooves having semi-circular cross sectional shape were formed on the inner wall of a water conduit 2. Separate electric conductive plates 4a, 4b are embedded in these grooves by means of, for example, die-forming. One pair of the electric conductive plates 4a, 4b is arranged in a direction perpendicular to the direction of arrangement of the permanent magnets 1a, 1b.

It is generally impossible to generate from and outside a discrete magnet magnetic a flux density higher than the residual magnetization (Br) of such magnet. That is, even if a magnet having extremely large dimensions is mounted in a magnetic circuit within a space, the magnetic flux density issuing out of the magnet approaches but does not exceed the residual flux density (Br).

Figure 8A:
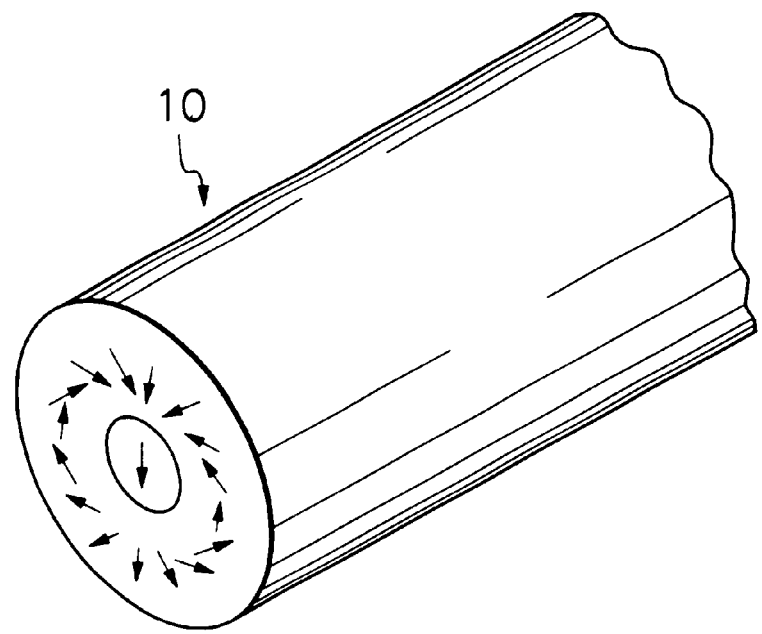
FIG. 8(a) illustrates the principle of a dipole magnetic ring.
Figure 8B:
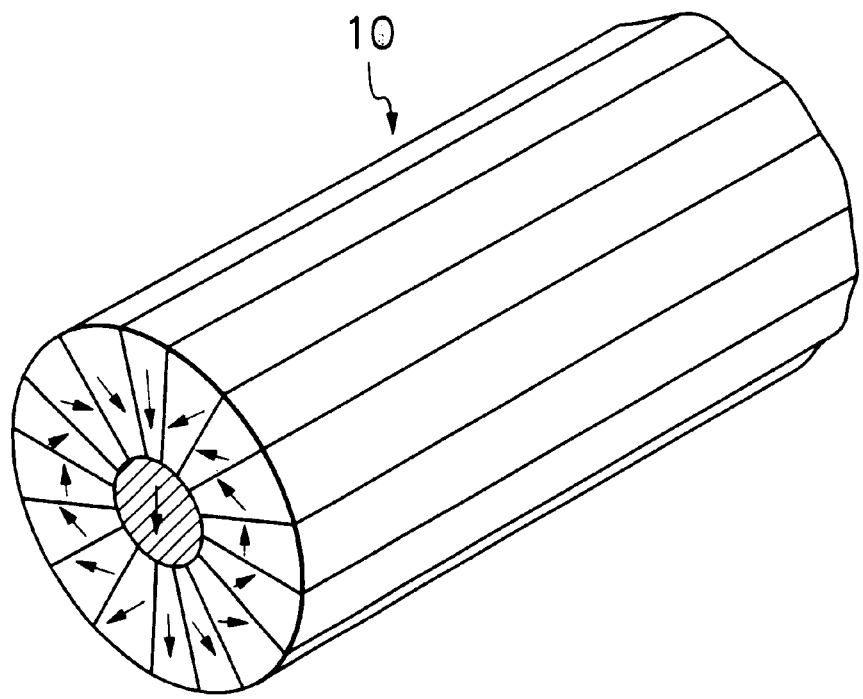
FIG. 8(b) illustrates an example of the magnetic circuit having the dipole magnetic ring structure.
Figure 9:
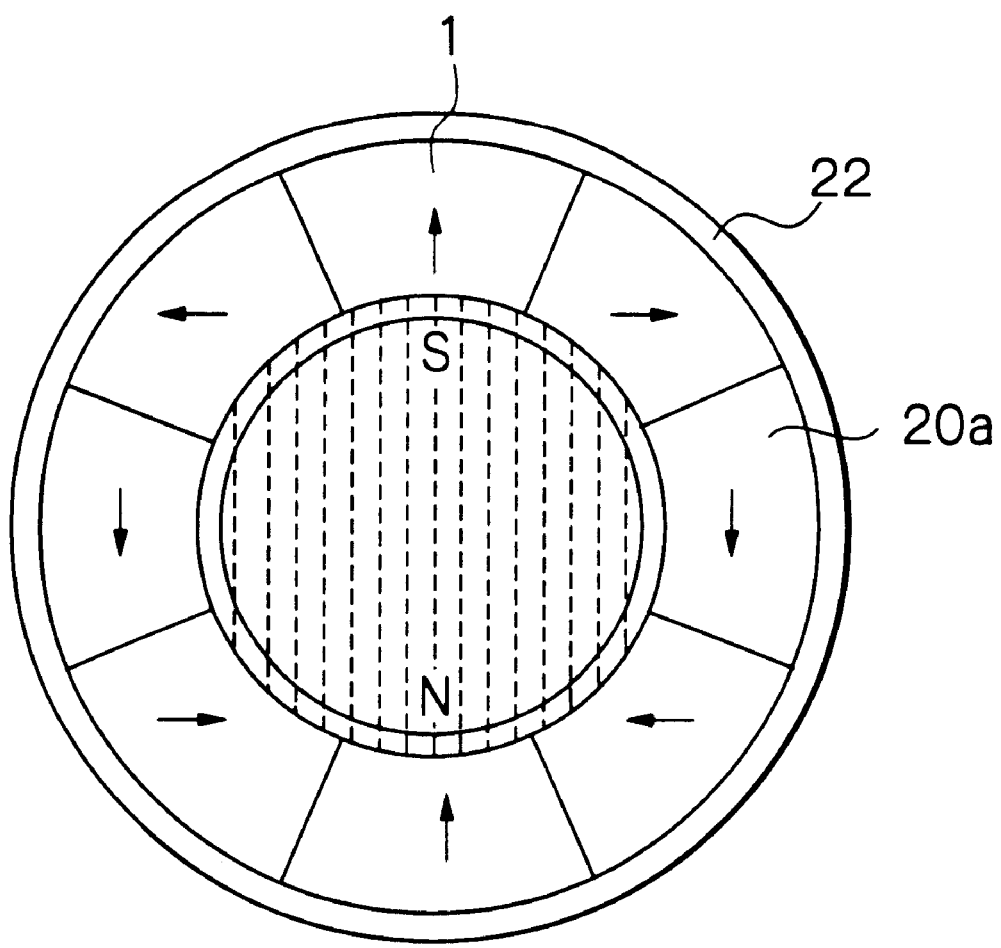
FIG. 9 illustrates a cross sectional view of the magnetic treating apparatus having a dipole magnetic ring structure.
Figure 10:
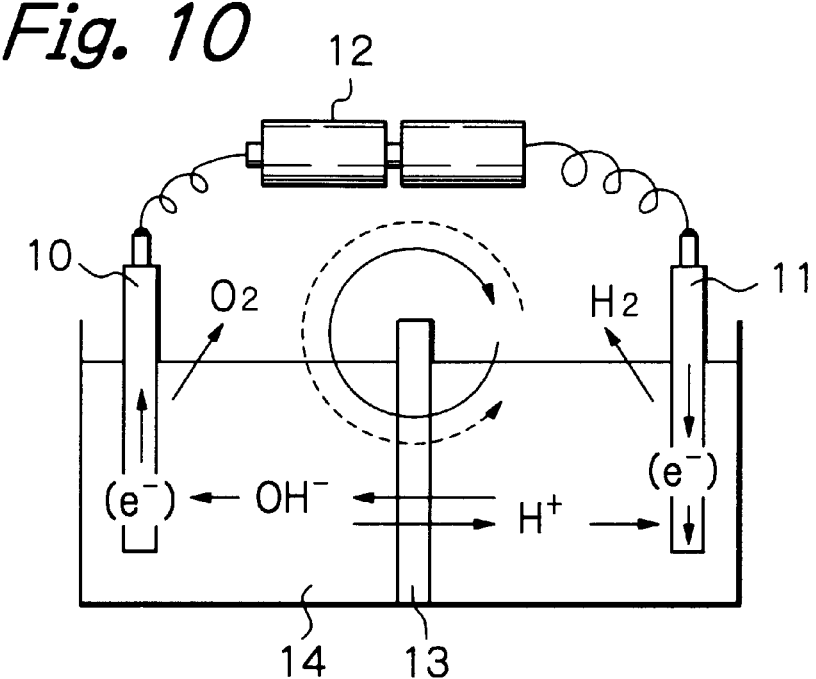
FIG. 10 illustrates the electrolytic decomposition of water.

However, according to the theory of a dipole magnetic ring, the magnet consists of portions having identical intensity, and the magnetization direction ($\alpha$) of the portions is varied according to $\alpha=2\Phi+(\pi/2)$. The magnetic field H in the inner space of the magnet is expressed by $H=Br \cdot \ln(\rho_0/\rho_1)$. Here, the Br is the residual flux density of a magnet, $\rho_0$ is the outer diameter, and $\rho_1$ is the inner diameter of the magnet. Therefore, H>Br is attained when $\rho_0 > 2.7\rho_1$. The direction of a magnetic field is changed as shown in FIG. 8(a). It is, however, not easy to change the direction of a magnetic field like this in one integral magnet. The magnets having wedged cross-sections are combined as shown in FIG. 8(b). Satisfactory results can be achieved by such combination. Preferable number of magnets is from six to eighteen. When a magnetic circuit, which can extract flux density higher than the residual flux density of a magnet, is mounted in the magnetic treating apparatus, its performance can be considerably enhanced. Alternatively, the apparatus can be considerably small-sized compared with conventional apparatuses provided that the performance of both apparatuses is identical The wedge shaped Nd-Fe-B magnets 10 FIG. 9) have a dipole magnetic ring structure, i.e., $\alpha=2\Phi+(\pi/2)$. The lines of magnetic flux are uniform and parallel to one another at all inner portions of the water conduit 2 Referring to FIG. 10, the reference numerals 10 is cathode, 11 is anode. 12 is MHD batteries, 13 is partition, and 14 is electrolyte liquid. The solid line and dotted line indicate the flow of electrons and the current flow, respectively. When the MHD voltage is generated in a magnetic treating apparatus, the water undergoes electrolytic decomposition to generate active water and active hydrogen. In FIG. 10, the MHD voltage is replaced with the batteries 12. The generation mechanism of the active oxygen and active hydrogen is described with reference to FIG. 9. That is, the reactions occurring on the anode are $2OH^- \rightarrow 2e^-$(discharge)$\rightarrow H_2O+O$ (active oxygen) $\rightarrow$(molecular) $O_2$. On the other hand, the reactions occurring on the cathode are $H^++e^- \rightarrow H$ (active hydrogen)$\rightarrow$ (molecular) $H_2$. Although the partition 9 is provided in FIG. 10, the anodic and cathodic reactions take place in an identical location in the water conduit.

Figure 15:
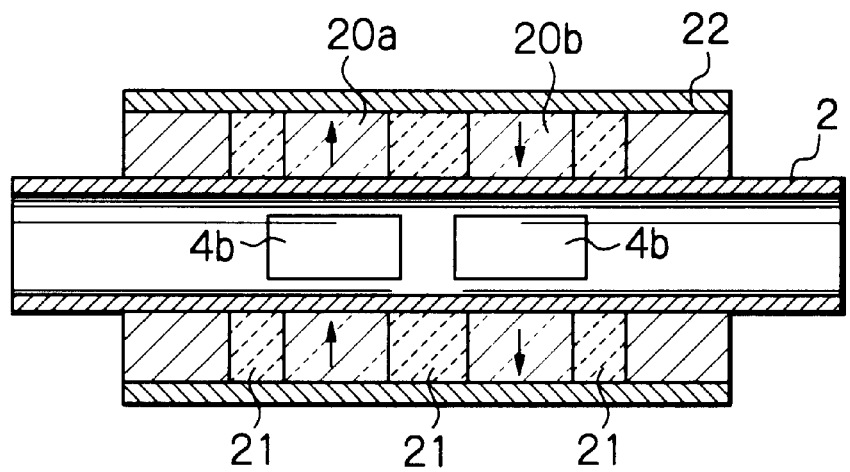
FIG. 15 is a cross-sectional drawing of the treating apparatus of water according to an embodiment of the present invention.

In FIG. 15 is shown an apparatus used for investigating the difference in the generation amounts of active oxygen and active hydrogen depending upon the presence or absence of an electric conductor.

(A) Absence of electric conductor. Application of alternating magnetic, field. 10 mA of MHD current. 25 cm/sec of standard flow speed.

(B) Presence of electric conductor. Application of alternating magnetic field. 25 mA of MHD current. 25 cm/sec of standard flow speed.

Figure 11:
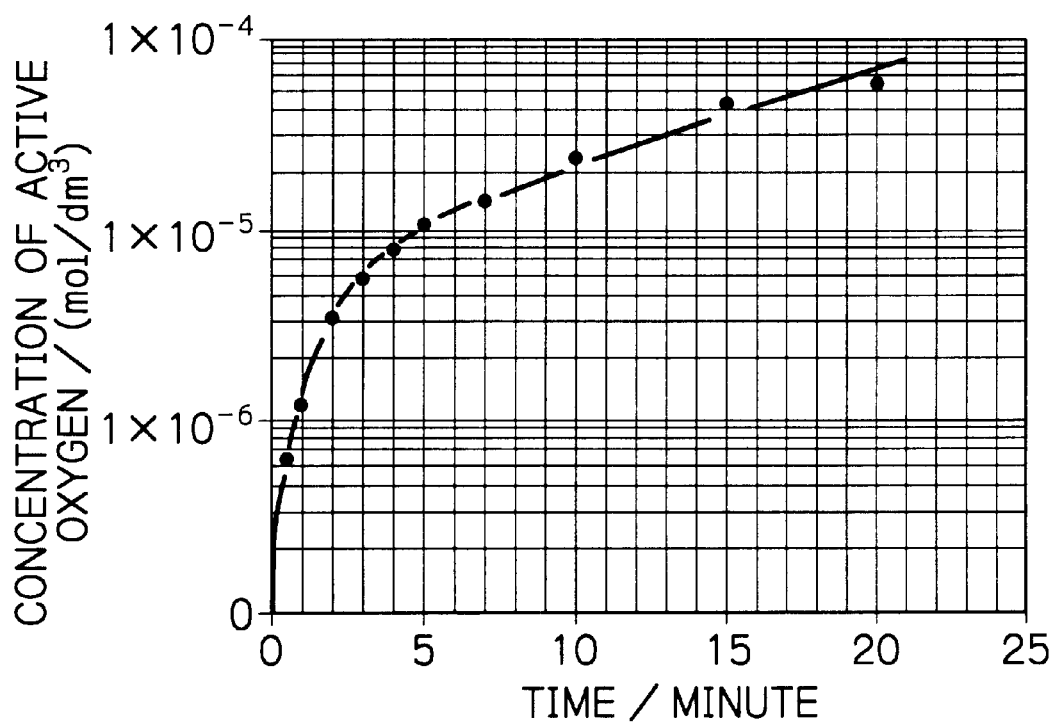
FIG. 11 is a graph showing the change in concentration of active oxygen generated by the decomposition of water without use of an electric conductor.
Figure 12:
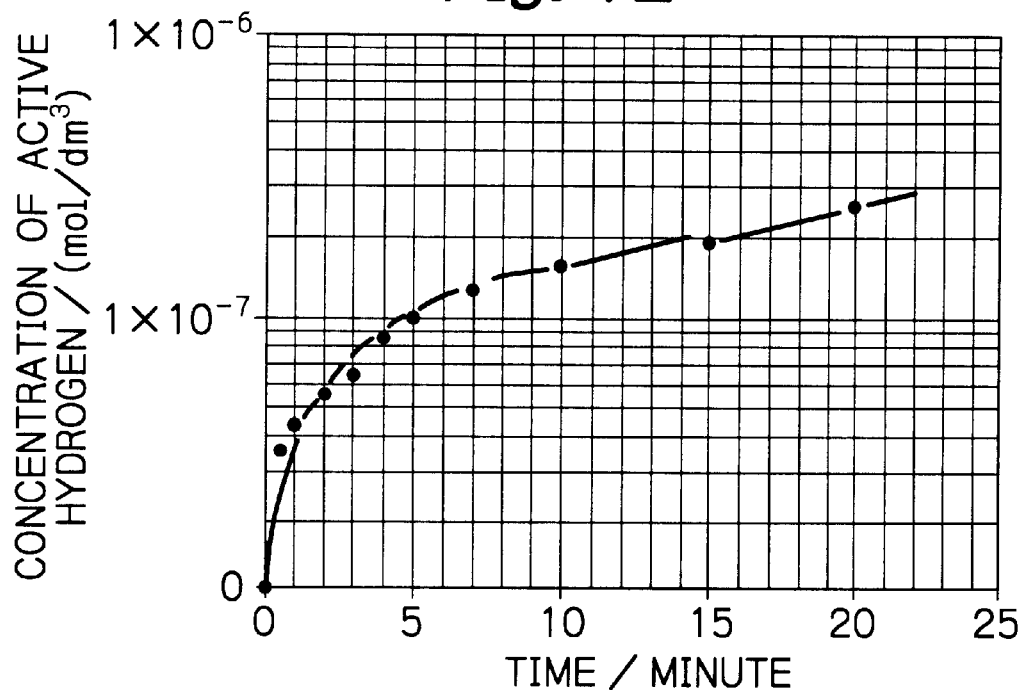
FIG. 12 is a graph showing the change in concentration of active hydrogen generated by the decomposition of water without use of electric conductor.
Figure 13:
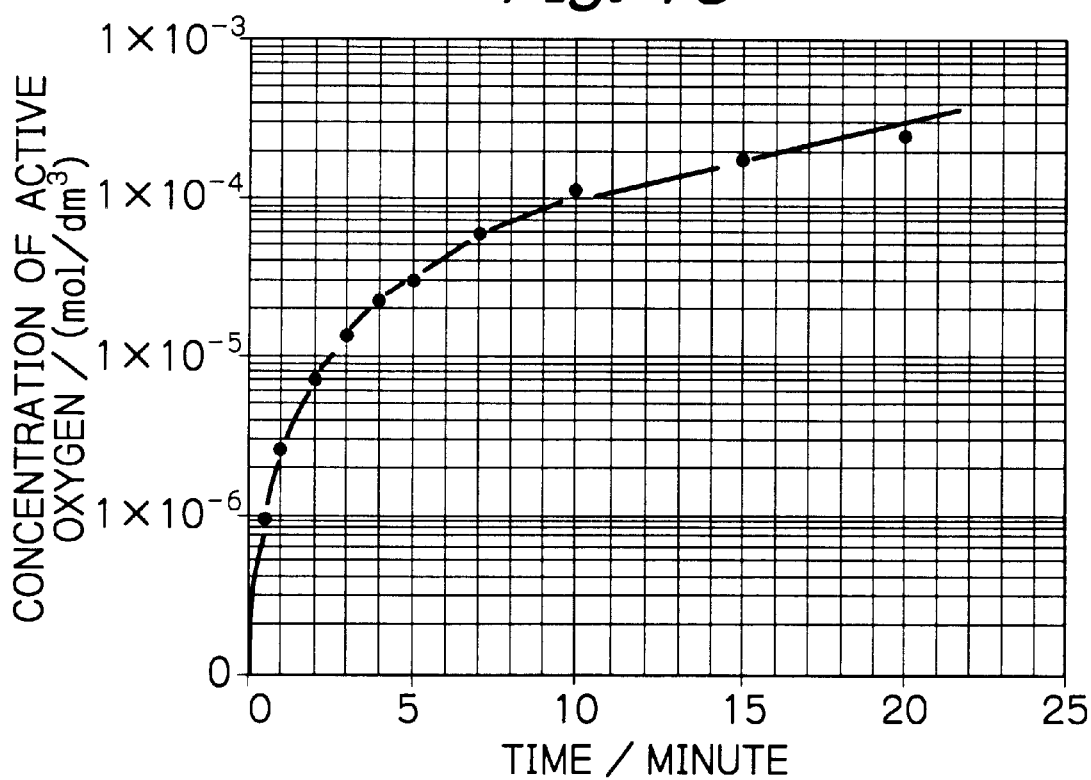
FIG. 13 is a graph showing the change in concentration of active oxygen generated by the decomposition of water with use of an electric conductor.
Figure 14:
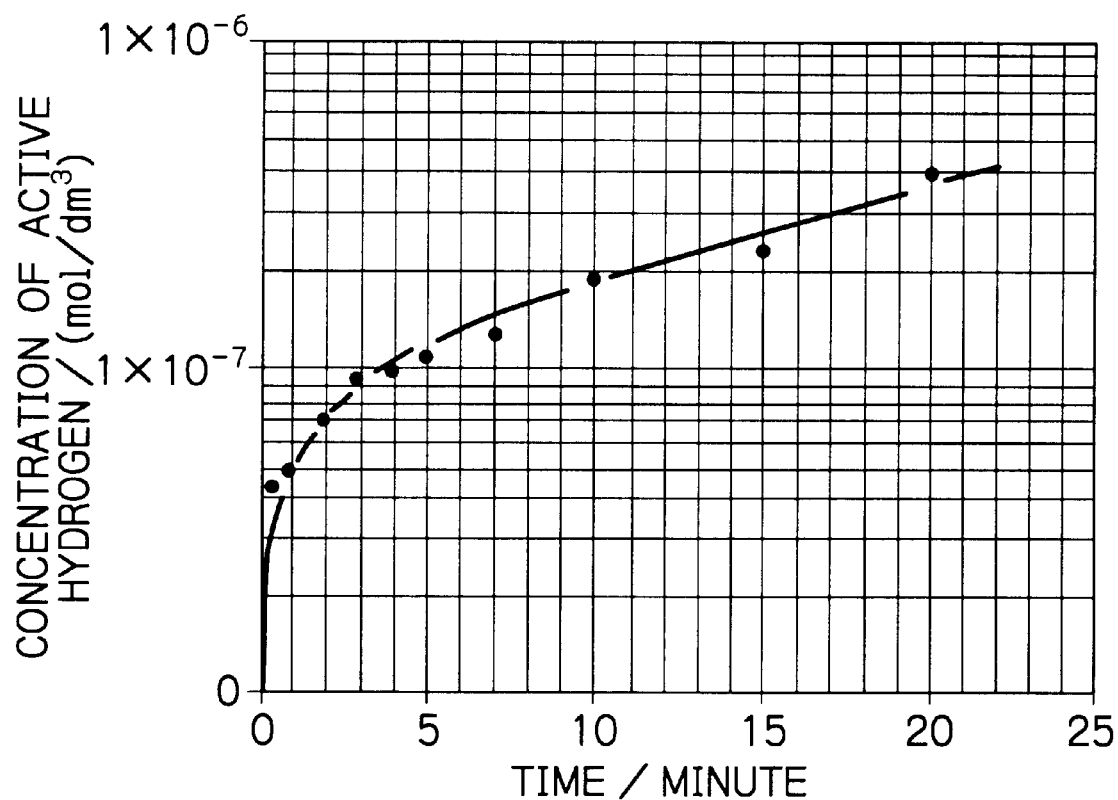
FIG. 14 is a graph showing the change in concentration of active hydrogen generated by the decomposition of water with use of an electric conductor.

The above-mentioned condition (A) corresponds to a comparative example. The concentrations, of active hydrogen and active oxygen are shown in FIGS. 11 and 12, respectively. The above-mentioned condition (B) corresponds to an inventive example. The concentrations of active hydrogen and active oxygen are shown in FIGS. 13 and 14, respectively. As is clear from these drawings, the concentrations of both active hydrogen and active oxygen according to the inventive condition (B) are approximately five times as high as those of the comparative condition (A).

The present invention is described with reference to a specific example.

FIG. 15 is a cross-sectional view of the magnetic treating apparatus of water mounted in a section of the water conduit 2. The water conduit 2 consists of an ordinary vinyl chloride tube having 20 mm of inner diameter. Two magnetic circuits 20a, 20b having a dipole magnetic ring structure are bonded on the outer peripheral surface of the water conduit. The upward magnetic flux as seen in the drawing is generated by the magnetic circuit 20a, while the downward magnetic flux as seen in the drawing is generated by the magnetic circuit 20b. The outer diameter R and inner diameter r of these magnetic circuits, 20a and 20b, respectively, satisfy the relationship R>2.7 r.

The permanent magnets 1 (for example, the ferrite magnet), of which the magnetic circuits 20a, 20b are constructed, have the shape and arrangement as shown in FIG. 16. The magnetization direction of the respective magnets 10 is changed as shown in the drawing, so as to generate in the water conduit 2 the magnetic flux in the direction of $H_1$ and $H_2$. A spacer 21 made of non-magnetic material is interposed between the magnetic circuits 20a and 20b. The outer frame 22 made of an iron pipe and the spacers 21 rigidly secure the water conduit 2. Preferably, the spacers 21 are from 10 to 20 mm long, while the magnets 1 are approximately 20 mm long measured in the longitudinal direction of the conduit.

The electric conductive plates 4a, 4b are longer than the magnets 1 and are pressure-bonded on the water conduit at the front and rear locations as seen in the drawing.

Although the embodiment described above is related to the one in which the magnetic field is reversed, it would be apparent from the above description that the current necessary for activating water can be generated in two regions, where the direction of MHD electromotive force is different from one another. Furthermore, a person skilled in the art could modify the embodiments described above within the scope of claims.

What is claimed is:

1. A magnetic treating apparatus of water comprising:
   a water conduit, through which the water flows in a first direction;
   at least one neighboring pair of magnetic field-generating regions in said water conduit, in which regions a magnetic field is generated in a second direction essentially perpendicular to said first direction and is applied to said water; and,
   a first electric conductor, which is located in one of said magnetic field-generating regions and a third direction essentially perpendicular to said first direction and second direction intersects said first electric conductor; and,
   a second electric conductor, which is located in the other of said magnetic field-generating regions and the third direction essentially perpendicular to said first direction and second direction intersects said second electric conductor; said first and second electric conductors being in electrically non-contact with one another.

2. A magnetic treating apparatus of water according to claim 1, wherein said first electric conductor consists of a pair of electric conducting plates opposite to one another, and said second electric conductor consists of a pair of electric conducting plates opposite to one another.

3. A magnetic treating apparatus of water according to claim 2, wherein said first and second electric conductors are arranged in the first direction.

4. A magnetic treating apparatus of water according to claim 1, 2 or 3, wherein said second direction varies as seen in the flowing direction of water.

5. A magnetic treating apparatus of water according to claim 1, 2 or 3, wherein said water conduit consists of electric non-conductive material at least in a portion thereof in contact with water.

6. A magnetic treating apparatus of water according to claim 5, wherein said first and second electric conductors are rigidly secured on the electric non-conductive material of the water conduit.

7. A magnetic treating apparatus of water according to claim 1, 2 or 3, wherein each of said at least one pair of the magnetic field-generating regions comprises a permanent magnet having an N pole and a permanent magnet having an S pole, which are rigidly secured on the outer peripheral surface of the water conduit and are opposite to one another.

8. A magnetic treating apparatus of water according to claim 7, wherein the direction of the magnetic field is reversed as seen in the neighboring pair of magnetic field generating regions.

9. A magnetic treating apparatus of water according to claim 8, wherein said water conduit consists of electric non-conductive material at least in a portion thereof in contact with water.

10. A magnetic treating apparatus of water according to claim 9, wherein the length of permanent magnets in the flowing direction of water and the length of electric conductor in the flowing direction of water are substantially the same.

11. A magnetic treating apparatus of water comprising:
    a water conduit, through which the water flows in a first direction;
    a magnetic field-generating region for generating a magnetic field in a second direction essentially perpendicular to said first direction in said water conduit, which region comprising a plurality of permanent magnets having a wedge-shaped cross sectional shape and arranged to form a dipole magnetic ring structure.

12. A magnetic treating apparatus of water according to claim 11, wherein the magnetic flux density in said magnetic field-generating region is from 1000 to 3000 G.

13. A magnetic treating apparatus of water according to claim 11 or 12, wherein the lines of the magnetic flux are uniform and parallel to one another as seen in the cross section of the water conduit.

14. A magnetic treating apparatus of water according to claims 11, or 12, wherein said magnetic field-generating region consists of at least one neighboring pair of magnetic field-generating regions, wherein said apparatus further comprises:

a first electric conductor, which is located in one of said magnetic field-generating regions and a third direction essentially perpendicular to said first direction and second direction intersects said first electric conductor; and, a second electric conductor, which is located in the other of said magnetic field-generating regions and the third direction essentially perpendicular to said first direction and second direction intersects said second electric conductor; said first and second electric conductors being in electrically non-contact with one another.

15. A magnetic treating apparatus of water according to claim 14, wherein said first electric conductor consists of a pair of electric conducting plates opposite to one another, and said second electric conductor consists of a pair of electric conducting plates opposite to one another.

16. A magnetic treating apparatus of water according to claim 15, wherein said first and second electric conductors are arranged in the first direction.

17. A magnetic treating apparatus of water according to claim 16, wherein the direction of the magnetic field is reversed as seen in the neighboring pair of magnetic field generating regions.

18. A magnetic treating apparatus of water according to claim 17, wherein said first electric conductor consists of a pair of electric conducting plates opposite to one another, and said second electric conductor consists of a pair of electric conducting plates to one another.

* * * * *